US012729144B2

(12) United States Patent
Eaton

(10) Patent No.: US 12,729,144 B2
(45) Date of Patent: Sep. 8, 2026

(54) SYSTEMS, METHODS, AND COMPOUNDS FOR SUSTAINABLE WASTEWATER TREATMENT AND CO-PRODUCTS THEREOF

(71) Applicant: Michael P. Eaton, Mooresville, NC (US)

(72) Inventor: Michael P. Eaton, Mooresville, NC (US)

( * ) Notice: Subject to any disclaimer, the term of this patent is extended or adjusted under 35 U.S.C. 154(b) by 1100 days.

(21) Appl. No.: 17/735,693

(22) Filed: May 3, 2022

(65) Prior Publication Data

US 2022/0356100 A1 Nov. 10, 2022

Related U.S. Application Data

(60) Provisional application No. 63/184,464, filed on May 5, 2021.

(51) Int. Cl.
*C02F 9/00* (2023.01)
*C02F 1/00* (2023.01)
(Continued)

(52) U.S. Cl.
CPC ................ *C02F 9/00* (2013.01); *C02F 1/008* (2013.01); *C02F 1/5236* (2013.01); *C05F 7/00* (2013.01);
(Continued)

(58) Field of Classification Search
CPC ... C02F 9/00; C02F 1/008; C05F 7/00; C05G 5/10
See application file for complete search history.

(56) References Cited

U.S. PATENT DOCUMENTS 4,193,869 A 3/1980 Brucker et al.
4,382,864 A 5/1983 Hashimoto et al.
(Continued)

FOREIGN PATENT DOCUMENTS

CA 3206357 A1 * 7/2022 ............... C05D 9/02
CN 104903252 B 9/2015
(Continued)

OTHER PUBLICATIONS

United States Patent & Trademark Office, International Search Report and Written Opinion,PCT/ISA/220, Application No. PCT/US2022/027445, May 3, 2022, U.S. Patent & Trademark Office, Alexandria, VA.
(Continued)

*Primary Examiner* — Wayne A Langel
(74) *Attorney, Agent, or Firm* — Thomas P. O'Connell; O'Connell Law Firm

(57) ABSTRACT

A sequential batch reactor wastewater treatment system and method, a material combination for practicing the method, and a fertilizer co-product deriving therefrom. A pH lowering agent comprising an acid lowers the pH of wastewater. A first compound including chitin or chitosan comprises a filtering medium, a coagulant, and a flocculant, and a second compound comprises an adsorbent and a pH raising agent. Wastewater is mixed and aerated subsequent to introduction of each of the first and second compounds, and flocculation yields treated water and a sludge byproduct that may be dewatered and further processed to yield a useful fertilizer co-product. Within the first compound, diatomaceous earth operates as a filtering medium and bentonite clay acts as a coagulant and filtering medium. Within the second compound, activated carbon, calcium oxide (CaO), and caustic soda (NaOH) are operative to adsorb, disinfect, and raise the pH of the wastewater.

21 Claims, 3 Drawing Sheets

(51) Int. Cl.

| | |
|---|---|
| ***C05F 7/00*** | (2006.01) |
| ***C05G 5/10*** | (2020.01) |
| *C02F 1/20* | (2023.01) |
| *C02F 1/28* | (2023.01) |
| *C02F 1/50* | (2023.01) |
| *C02F 1/52* | (2023.01) |
| *C02F 1/66* | (2023.01) |
| *C02F 11/128* | (2019.01) |
| *C02F 101/30* | (2006.01) |

(52) U.S. Cl.

CPC ................ *C05G 5/10* (2020.02); *C02F 1/001* (2013.01); *C02F 1/20* (2013.01); *C02F 1/283* (2013.01); *C02F 1/50* (2013.01); *C02F 1/5263* (2013.01); *C02F 1/66* (2013.01); *C02F 11/128* (2013.01); *C02F 2101/30* (2013.01); *C02F 2209/06* (2013.01); *C02F 2303/02* (2013.01); *C02F 2303/04* (2013.01)

(56) References Cited

U.S. PATENT DOCUMENTS 4,933,087 A 6/1990 Markham, Jr. et al.
5,204,007 A 4/1993 Mosley et al.
5,417,861 A 5/1995 Burnham
5,433,865 A 7/1995 Laurent
9,550,690 B2 1/2017 Bae et al.
9,586,869 B1 3/2017 Burnham et al.
9,919,938 B2 * 3/2018 Soane ...................... C02F 1/56
10,703,662 B2 * 7/2020 Likander ............... C02F 1/5236
2009/0107920 A1 * 4/2009 Ward ...................... C02F 1/008
210/710
2015/0101988 A1 * 4/2015 Jensen ..................... B03D 1/24
210/116
2017/0072441 A1 * 3/2017 Bhushan ................... B09B 3/60
2020/0231483 A1 7/2020 Ervin
2020/0255307 A1 * 8/2020 Gerfen ...................... C02F 1/24
2022/0089463 A1 * 3/2022 Ervin ...................... C02F 1/286
2023/0183116 A1 * 6/2023 Ervin ..................... B01D 39/06
210/662

FOREIGN PATENT DOCUMENTS

CN 108328868 B 7/2018
CN 109110960 A 1/2019
KR 20040002831 A 7/2004
KR 101902337 B1 * 11/2018 .............. C05F 11/00
KR 102277551 B1 * 7/2021 ................ C02F 1/40
WO WO-2006056022 A1 * 6/2006 ............ C02F 1/5245
WO WO-2007074758 A1 * 7/2007 ............ C02F 1/5236
WO WO2012018249 A1 2/2012
WO WO2014171812 10/2014
WO WO-2022157783 A1 * 7/2022 ............ B01J 20/048

OTHER PUBLICATIONS

Lichtfouse Eric et al: “Chitosan for direct bioflocculation of wastewater”, Environmental Chemistry Letters, Springer International Publishing, CHAM, vol. 17, No. 4, Jul. 19, 2019, pp. 1603-1621.

* cited by examiner 10
12
14
16
18
20
22

SYSTEMS, METHODS, AND COMPOUNDS FOR SUSTAINABLE WASTEWATER TREATMENT AND CO-PRODUCTS THEREOF

RELATED APPLICATION

This application claims priority to Provisional Application No. 63/184,464, filed May 5, 2022, the entirety of which being incorporated herein by reference.

FIELD OF THE INVENTION

The present invention relates generally to the treatment of wastewater. More particularly, disclosed herein are sustainable systems, methods, and compounds for wastewater treatment that are operative to yield treated water and a dewatered sludge within which undesirable content is reduced or eliminated with potential utility as a fertilizer co-product.

BACKGROUND OF THE INVENTION

Wastewater can be defined as used water that includes suspended and dissolved substances. Substances within wastewater may include natural chemicals, synthetic chemicals, human waste, food waste, oils, soaps, and other materials derived from commercial or residential sources. As a consequence, wastewater typically retains pathogens, such as bacteria, parasites, organic and inorganic particles, animals, such as protozoa and insects, macro-solids, gases, emulsions, toxins, and chemicals.

Numerous wastewater treatment systems have been disclosed by the prior art. Such systems range, for instance, from small residential and commercial septic systems to large municipal and industrial facilities for treating wastewater from commercial operations and municipalities. While varied in method and structure, wastewater treatment systems have the common object of treating the wastewater for suspended solids, biochemical oxygen demand, nitrogen compounds, phosphorous, *E-coli* and other bacteria, and other toxins and chemicals to minimize undesirable output. Such systems seek to reduce pollutants in wastewater to a level that can be accepted and handled by nature or to meet particular water quality criteria and standards. Wastewater treatment methods typically include one or more of physical, chemical, or biological treatments.

Physical wastewater treatment methods include sedimentation, screening, aeration, filtration, flotation and skimming, degasification, and equalization. Such methods have beneficial effects. However, they fail to treat undesirable components within the wastewater. Furthermore, they often require substantial capital investment in treatment facilities.

Chemical wastewater treatments include, by way of example, chlorination, ozonation, neutralization, coagulation, flocculation, adsorption, ion exchange, and precipitation. These treatment methods seek to remove, for instance, chemical oxygen demand, metals, suspended solids, ammonia, and other toxic pollutants.

In flocculation, chemical additives, commonly referred to as flocculating agents, are employed to cause suspended solids to form aggregates called flocs. Flocculating agents commonly used for urban wastewater treatment include aluminum and calcium carbonate and synthetic polymers. In such systems and methods, potentially hazardous and unpleasant chemicals are thus introduced into the wastewater. While they have the object of destroying pollutants, such chemicals can have the concomitant effects of destroying even beneficial components within the wastewater while risking inadvertent environmental contamination and other deleterious effects on the treated water and the environment.

Chlorination in wastewater treatment is operative to disinfect the treated wastewater. Chlorination is useful in destroying pathogenic and non-pathogenic microorganisms within wastewater. However, chlorination often leaves the treated water with an unpleasant taste and smell. Moreover, chlorine compounds, inorganic chloramines, and other disinfecting chemicals can harm flora, fauna, and the environment in general.

Other wastewater systems and methods employ biological treatments to accelerate the breakdown of solids and contaminants. Such biological treatments typically involve the introduction of microbes into the wastewater that have an affinity for the pollutants within the water. Rather than simply permitting solids to decant from the wastewater slowly and then perhaps applying a hazardous chemical treatment, microbes are permitted to act upon the wastewater during treatment and prior to discharge from the treatment system.

Advantageously, such microbes in biological treatment systems and methods remove pollutants faster than would occur without their introduction. However, substantial time is required for the microbes to act since the microbes must multiply and then feed on the contaminants. Consequently, the wastewater must be held for a substantial period of time in a holding tank, a filter, a fixed film, or other media. Furthermore, upon completion of their ingestion of pollutants within the wastewater, microbes may simply die and end up as waste solids themselves. Those solids fall to the bottom of the treatment tank or unit for subsequent removal, or they may remain and block available surface area or volume, which results in locations of inactivity.

Such aerobic and anaerobic microbe treatments have significant advantages, including potentially the avoidance of hazardous chemicals. However, they are often not sufficiently effective and require adequate dwell time for the microbes to feed on enough of the pollutants to render the wastewater satisfactorily low in contaminants. Moreover, to treat wastewater in significant volumes, large-scale treatment facilities are required. Indeed, stages of wastewater treatment relying on microbes are notoriously problematic due to the complexity of maintaining the large bacterial colonies necessary to treat the wastewater biologically. They require costly and complicated equipment and facilities, which often result in corresponding increases in mechanical failure and system downtime. Moreover, bacterial colonies intended to convert wastewater contaminants into less toxic forms often produce greenhouse gas byproducts, such as methane, nitric oxide, and carbon dioxide. If not harvested and exploited, such gasses can have deleterious environmental effects. Still further, the efficiency and flow of such systems can be adversely affected over time as spent microbes that do not fall to the bottom of the tank clog the system.

A further issue relating to prior art wastewater treatment methods is the resulting byproduct commonly referred to as sludge. A portion of the sludge byproduct, referred to as return-activated sludge, may be recirculated to aeration tanks to sustain aerobic treatment. However, the wastewater treatment operator typically must dewater and dispose of excess sludge, commonly referred to as waste-activated sludge. The equipment, material, labor, and environmental costs of disposing of waste-activated sludge, whether through landfilling, incineration, or otherwise, can be substantial with the costs of acceptance at landfills and the expense of incineration having increased markedly in recent years. Furthermore, such methods do not always produce a product with useful physical or chemical properties. While wastewater sludge can be treated and conditioned for beneficial reuse, the development of such beneficial use options likewise entails substantial costs.

In view of the foregoing, there is a clear need in the art for a wastewater treatment process and a system for implementing such a process that reduce or eliminate harmful components within wastewater in an efficient and effective manner while avoiding the need for hazardous chemicals and the potential environmental contamination that can derive therefrom, ideally while producing a solid byproduct with useful properties.

SUMMARY OF THE INVENTION

With an awareness of the foregoing, the present inventor set forth with the basic object of creating wastewater treatment processes, wastewater treatment compounds, and systems for implementing such processes and compounds that reduce or eliminate harmful components within wastewater in an efficient and effective manner.

A further object of the invention is to provide systems, methods, and compounds for wastewater treatment that avoid the need for hazardous chemicals thereby eliminating the risk of environmental contamination resulting therefrom.

A more particular object of embodiments of the invention is to provide a wastewater treatment method that is effective in lowering undesirable substances and qualities within wastewater, including total suspended solids (TSS), viscous liquids, such as grease and oil, per- and polyfluoroalkyl substances (PFAS), perfluorooctanesulfonic acid (PFOS), volatile organic compounds (VOCS), such as dioxane and other regulated compounds, nitrates, phosphates, chemical oxygen demand (COD), biological oxygen demand (BOD), ammonia, and fecal matter.

A further object of embodiments of the invention is to provide a wastewater treatment method that is capable of yielding a solid byproduct with useful physical and chemical properties based on the recognition that beneficial reuse options through resource recovery and conservation programs are highly desirable.

In certain practices of the invention, an object is to provide a wastewater treatment method that yields a sludge byproduct that is free of or substantially free of synthetic polymers and other unwanted substances thereby permitting the application of the same as a fertilizer.

These and further objects and advantages of the present invention will become obvious not only to one who reviews the present specification and drawings but also to those who have an opportunity to experience an embodiment of the wastewater treatment methods, compounds, and systems disclosed herein in practice. However, it will be appreciated that, while the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth one or more of the foregoing objects, one embodiment of the invention can be characterized as a method for the treatment of wastewater. The wastewater treatment method may begin with introducing a pH lowering agent to the wastewater to adjust the pH of the wastewater to an optimum level for the initial reaction. Then, a first compound is introduced to the wastewater with the first compound comprising a filtering medium, a coagulant, and a flocculant. The first compound may include, for instance, chitin or chitosan, which are naturally occurring materials with a demonstrated ability to bind organic compounds. Chitin and chitosan are thus operative as coagulants and flocculants. The wastewater with the first compound introduced therein is then mixed and aerated for a first mixing and aeration time. A second compound is then introduced to the wastewater with the second compound comprising an adsorbent and a pH raising agent. The wastewater with the second compound introduced therein is then mixed and aerated for a second mixing and aeration time. Then, a flocculation period is provided sufficient to allow at least partial separation of the wastewater to yield treated water and a sludge byproduct prior to a drawing off of the treated water. The flocculation period can, for example, be provided with the wastewater disposed in a settling tank. Undesirable content within the wastewater is thus reduced and a sludge byproduct of potentially useful properties is yielded.

Practices of the method can include dewatering the sludge byproduct, such as by operation of a sludge dewatering process or machine. By way of example and not limitation, the sludge dewatering machine can be chosen from the group consisting of a plate-and-frame filter press, a belt filter press, a centrifuge, a stacked sludge system, and a screw press. Dewatering can alternatively or additionally be accomplished with an enhanced evaporation system chosen from the group consisting of an open bed dryer and a greenhouse evaporation dryer.

According to embodiments of the invention, the step of introducing a pH lowering agent can comprise applying an acid to the wastewater. The acid can, for example, comprise sulfuric acid ($H_2SO_4$).

It is further disclosed that the first compound can further comprise diatomaceous earth as a filtering medium and bentonite clay as a coagulant and filtering medium. The diatomaceous earth can, for example, be according to CAS Registry Number 91053-39-3 while the bentonite can be according to CAS Registry Number 1302-78-9 and the chitin or chitosan can be according to CAS Registry Number 9012-76-4. In particular versions of the first compound, the chitin or chitosan comprises approximately 5 to 10% by weight of the compound, and the diatomaceous earth and bentonite are provided in equal portions of approximately 45 to 47.5% by weight of the first compound.

Also according to embodiments of the invention, the second compound can include activated carbon, calcium oxide (CaO), caustic soda (NaOH), and, potentially, silicon dioxide. Embodiments of the second compound are disclosed herein wherein the activated carbon comprises approximately 40-50% by weight of the second compound and the calcium oxide and caustic soda each comprise approximately 20-25% by weight of the second compound. In practices of the method, the second compound can be introduced in a quantity and composition sufficient to raise the pH balance of the wastewater to between approximately 7 and 10 on the pH scale.

To facilitate the step of introducing the pH lowering agent to the wastewater, the method can further comprise the steps of measuring the pH of the wastewater, determining a volume of the wastewater, and calculating the quantity of pH lowering agent to be introduced to the wastewater based on the pH of the wastewater as measured and the volume of the wastewater. These steps can be performed prior to the step of introducing the pH lowering agent to the wastewater.

According to embodiments of the invention, the first mixing and aeration time can be between 1 and 12 hours. In a similar manner, the second mixing and aeration time can likewise be between 1 and 12 hours.

Embodiments of the invention can alternatively be characterized as a fertilizer co-product produced from a sludge byproduct yielded by the method disclosed herein. To this end, the sludge byproduct can be further processed to produce the fertilizer co-product. Further processing can include, for instance, dewatering the sludge byproduct. The further processing can additionally include introducing and blending nitrogen in solid form with the sludge byproduct and, ultimately, pelletizing the sludge byproduct, such as with a granulator machine.

Still further, embodiments of the invention can be characterized as a sequential batch reactor wastewater treatment system for treating wastewater. The system can, for instance, comprise a holding tank, a pH lowering agent for lowering the pH of the wastewater in the holding tank, a first reaction tank, a first compound comprising a filtering medium, a coagulant, and a flocculant wherein the first compound includes chitin or chitosan operative as a coagulant and flocculant, a second reaction tank, a second compound comprising an adsorbent and a pH raising agent, and a settling tank. In certain practices, the system can further include a sludge dewatering machine, such as a machine chosen from the group consisting of a plate and frame filter press, a belt filter press, a centrifuge, a stacked sludge system, and a screw press. Additionally or alternatively, an enhanced evaporation system can be employed for dewatering the sludge byproduct. The enhanced evaporation system can, for example, be chosen from the group consisting of an open bed dryer and a greenhouse evaporation dryer.

Practices of the invention can alternatively be characterized as a material combination for the treatment of wastewater comprising a first compound and a second compound. The first compound comprises a filtering medium, a coagulant, and a flocculant including chitin or chitosan operative as a coagulant and flocculant, and the second compound comprises an adsorbent and a pH raising agent. In certain embodiments, the material combination can further include a pH lowering agent, such as an acid, for lowering the pH of the wastewater.

Embodiments of the first compound of the material combination can comprise diatomaceous earth as a filtering medium and bentonite clay as a coagulant and filtering medium. The chitin or chitosan can be provided as approximately 5 to 10% by weight of the first compound. Embodiments of the second compound can include activated carbon, calcium oxide (CaO), and caustic soda (NaOH). For instance, the activated carbon can comprise approximately 40-50% by weight of the second compound while the calcium oxide and caustic soda each can comprise approximately 20-25% by weight of the second compound.

One will appreciate that the foregoing discussion broadly outlines the more important goals and certain features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

DETAILED DESCRIPTION OF PREFERRED EMBODIMENTS

Figure 1:
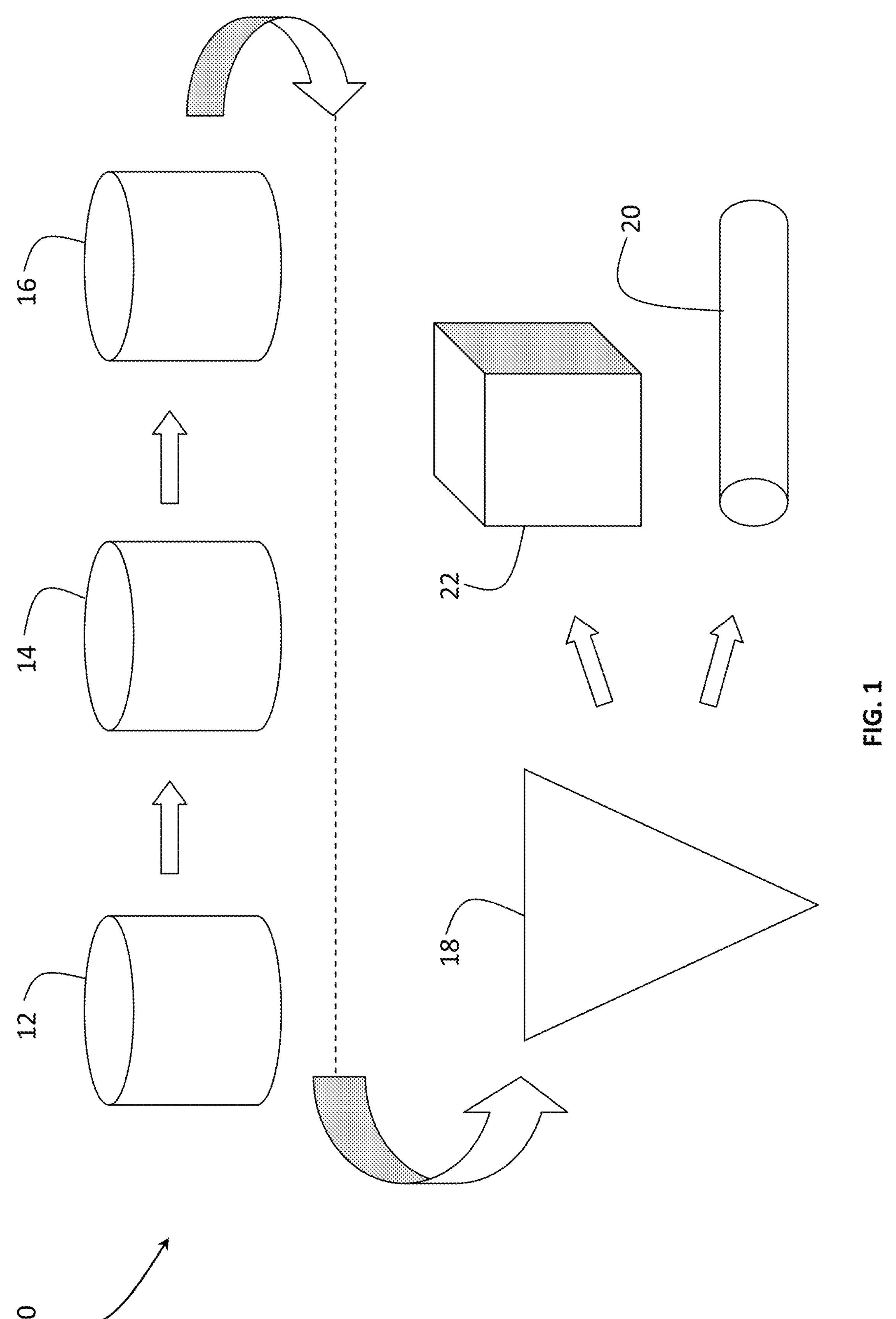
FIG. 1 is a schematic view of a wastewater treatment system according to the present invention.

To ensure that one skilled in the art will fully understand and, in appropriate cases, be able to practice the present invention, certain preferred embodiments of the wastewater treatment method, system, and compounds revealed herein are described below and shown in the accompanying drawing figure. It will be understood, however, that the wastewater treatment systems, compounds, and methods are subject to a variety of further embodiments, each within the scope of the invention.

In one practice of the disclosed method for wastewater treatment, a volume of wastewater to be treated is provided, whether by being received into one or more vessels or other retaining areas, by its preexistence as a body of water, or otherwise. The volume of wastewater to be treated can be calculated, whether by measurement using a flow meter, by receipt into a vessel or vessels of known volume, by mathematical calculation, or by some other method or combination thereof. If and as necessary, the original pH of the wastewater can be measured and recorded.

With the volume of wastewater thus received or otherwise in place for treatment and the original pH of the wastewater known, the wastewater treatment process proceeds with a lowering of the pH of untreated wastewater. The pH may, by way of non-limiting example, be lowered by approximately two to three points on the pH scale. One method of lowering the pH pursuant to the invention is through the addition of a pH lowering agent comprising an acid, such as sulfuric acid ($H_2SO_4$), hydrochloric acid (HCl), or another acid effective to reduce the pH of the wastewater by a predetermined amount on the pH scale. The volume or otherwise measured amount, the type, and, additionally or alternatively, other characteristics of the pH lowering agent to be added to the wastewater may be calculated or otherwise determined dependent on multiple factors, including the volume of wastewater to be treated and the initial pH and other characteristics of the wastewater.

With the pH lowered, the wastewater is ready for the introduction of compounds according to the present method for wastewater treatment. In one practice of the invention, for instance, a first of two compounds is introduced. The volume, mass, or other measured amount, the composition, and, additionally or alternatively, other characteristics of the first compound introduced may be calculated based on one or more factors, including the volume of wastewater to be treated and, potentially, measured, expected, or predicted characteristics of the wastewater. With the first compound introduced, the wastewater is then mixed and aerated for a predetermined first mixing and aeration time. The first mixing and aeration time in certain practices of the invention ranges from 1 to 12 hours. With the wastewater mixed and aerated, a second compound is introduced into the wastewater, and the wastewater is again mixed and aerated for a predetermined second mixing and aeration time. The volume, mass, or other measured amount, the composition, and, additionally or alternatively, other characteristics of the second compound introduced may be calculated based on one or more factors, including the volume of wastewater to be treated and, potentially, measured, expected, or predicted characteristics of the wastewater. The second mixing and aeration time in particular practices of the invention ranges from 1 to 12 hours.

With the first and second compounds and the wastewater mixed and aerated over the first and second mixing and aeration times, the wastewater is retained to flocculate in a settling tank over a flocculation period. In certain practices of the invention, the settling tank can be a cone-shaped or tapered tank. As the flocculation occurs, unwanted substances within the wastewater tend to bond together through absorption and/or adsorption and precipitate to the bottom of the settling tank. Volumes of treated water and sludge byproduct are thus created.

So treated, the wastewater can then be drawn off, decanted, or otherwise separated from the sludge byproduct. Where the treated wastewater is drawn off, for example, the sludge byproduct will be left behind in the settling tank. The sludge is then dewatered, whether in place within the settling tank, in one or more dewatering locations, or otherwise. For instance, the sludge can be removed from the settling tank and dewatered, such as but not limited to by use of a sludge dewatering machine. The sludge dewatering could by way of example and not limitation be performed by a sludge dewatering machine comprising a plate-and-frame filter press, a belt filter press, a centrifuge, a stacked sludge system, a screw press, or any other effective sludge dewatering mechanism. Additionally or alternatively, an enhanced evaporation system can be employed for dewatering the sludge byproduct. The enhanced evaporation system can, for example, be chosen from the group consisting of an open bed dryer and a greenhouse evaporation dryer.

According to certain manifestations of the invention, the first of the two compounds comprises a mixture of a filtering medium and one or more coagulants and flocculants. More particularly, manifestations of the first compound incorporate diatomaceous earth as a filtering medium, bentonite clay as a coagulant and filtering medium, and chitosan or chitin as a coagulant and flocculant. Without imposing any limitations on the invention apart from those expressly included in the claims, the Diatomaceous Earth can be according to CAS Registry Number 91053-39-3, the Bentonite can be according to CAS Registry Number 1302-78-9, and the Chitosan or Chitin can be according to CAS Registry Number 9012-76-4.

Diatomaceous earth is operative within the waste water treatment method and compounds as a natural filtration aid. Formed largely of silica, diatomaceous earth improves filtering capacity and helps to remove suspended solids, semi-colloids, and oily liquids. Bentonite clay is operative as a coagulant and filtration aid to absorb a wide variety of contaminants and to encapsulate suspended solids, organic compounds, and toxicants. Chitin as employed within the waste water treatment method and compounds is operative as a coagulating and flocculating agent. Chitin effectively coagulates organic compounds, acts as a chelating polymer for binding toxic heavy metals, and performs as an adsorption medium for dyes and small concentrations of phenols and polychlorinated biphenyls (PCBs) as are commonly present in industrial wastewaters.

In particular practices of the method and compound, chitosan makes up approximately 5 to 10% by weight of the first compound with the remainder of the first compound being approximately evenly split between the diatomaceous earth and the bentonite clay. As a result in such embodiments, each of diatomaceous earth and bentonite clay comprises approximately 45 to 47.5% by weight of the first compound. The amount of the first compound to be added to the wastewater may be dependent on a plurality of factors including the volume of wastewater to be treated and the initial pH and other characteristics of the wastewater.

In preferred embodiments, the chitosan is provided in powdered form. Chitosan is a molecular derivative of chitin produced by the removal of acetyl groups. Chitin occurs naturally in the shells of shellfish and is derived therefrom. It has been found that the exoskeleton of shellfish is typically composed of chitin (20-30% w/w), proteins (20-40% w/w), minerals (30-60% w/w), and by pigments and lipid in traces. Chitin and chitosan are naturally nontoxic, biodegradable, and biocompatible. In view of the many tons of chitin that is otherwise wasted as, for instance, shrimp, lobster, and crab shell residue, the exploitation of chitosan in wastewater treatment methods and compounds as disclosed herein is efficient and environmentally sustainable.

In practices of the invention, the second compound may comprise a mixture of activated carbon, calcium oxide (CaO), caustic soda (NaOH), and, potentially, silicon dioxide ($SiO_2$). The activated carbon, alternatively referred to as activated charcoal, is operative to adsorb natural organic compounds, taste and odor compounds, and synthetic organic chemicals. It has been found effective as an adsorbent based on its high porosity and large surface area to which contaminants may adsorb. Calcium oxide is operative as a pH raising agent and as a disinfectant. It also improves water taste, smell, and color. Caustic soda is also operative as a pH raising agent. Where included, silicon dioxide is operative as a defoaming and carrier agent.

Again without limiting the invention except as may be expressly provided in the claims, the activated carbon, charcoal or tempered charcoal may be according to CAS Registry Numbers 64365-11-3 or 7440-44-0, the calcium oxide may be according to CAS Registry Number 73018-51-6, the caustic soda may be according to CAS Registry Number 1310-73-2, and the silicon dioxide may be according to CAS Registry Number 7631-86-9. In particular examples, the charcoal comprises approximately 40-50% by weight of the mixture, calcium oxide and caustic soda are each approximately 20-25% by weight of the mixture, and the silicon is the remaining approximately 5-10% by weight. The second compound is a base and thus is operative to raise the pH balance of the wastewater, such as to the 7-10 range on the pH scale dependent on, among other things, the pH of the wastewater prior to treatment and the relative volumes of wastewater and the second compound.

A wastewater treatment system according to the invention is depicted in FIG. 1. There, the wastewater treatment system is indicated generally at 10. As disclosed herein, wastewater can be held initially in a holding tank 12 where the pH balance of the wastewater is lowered by the addition of the pH lowering agent. The wastewater can then be forwarded to a first reaction tank 14 where the first compound is introduced. The wastewater and the first compound are then mixed and aerated within the first reaction tank 14 for a period of time, which can be a predetermined first mixing and aeration time ranging, for instance, from 1 to 12 hours. After that period of time, the wastewater is advanced to a second reaction tank 16. The second compound is then introduced. The wastewater and the second compound are mixed and aerated within the second reaction tank 16 for a second mixing and aeration time, which can be a predetermined period of time ranging, for instance, from 1 to 12 hours. As noted hereinabove, the second compound comprises a base and tends to raise the pH balance of the wastewater, such as to the 7-10 range on the pH scale. The rise in pH will be dependent on, among other things, the pH level of the wastewater then to be treated with the second compound and the relative volumes of the wastewater and the second compound. The aforedescribed lowering and raising of the pH of the wastewater according to the invention have been found to promote flocculation.

The wastewater with the flocculated aggregates therein then travels to a settling tank 18 where the wastewater and flocculated aggregates are separated or permitted to separate into treated water and a sludge byproduct. The treated water is drawn off and provided to a treated water recipient 20. The treated water recipient 20 could comprise drainage piping or any other conduit or, additionally or alternatively, any vessel, body of water, or other location capable of receiving water. In certain practices of the invention, the treated water can be recycled through the wastewater treatment system 10 one or more times to enable increasingly refined treatment of the wastewater.

In any event, once the treated water is drawn off, the sludge byproduct left behind is dewatered. Dewatering could be effected, for instance, by use of a sludge dewatering machine 22. By way of non-limiting example, the sludge dewatering machine 22 could comprise a plate-and-frame filter press, a belt filter press, a centrifuge, a stacked sludge system, a screw press, or any other effective sludge dewatering machine 22. Dewatering can alternatively or additionally be accomplished by drying on a drying bed, by enhanced drying through evaporation, or through any other effective method.

The holding tank 12, the reaction tanks 14 and 16, the settling tank 18, and the sludge dewatering machine 22 thus cooperate to form the wastewater treatment system 10. The wastewater treatment system 10 may alternatively be referred to as a Sequential Batch Reactor 10. The Sequential Batch Reactor 10 so shown and described has been found to demonstrate substantial utility and effectiveness in treating wastewater.

Figure 2:
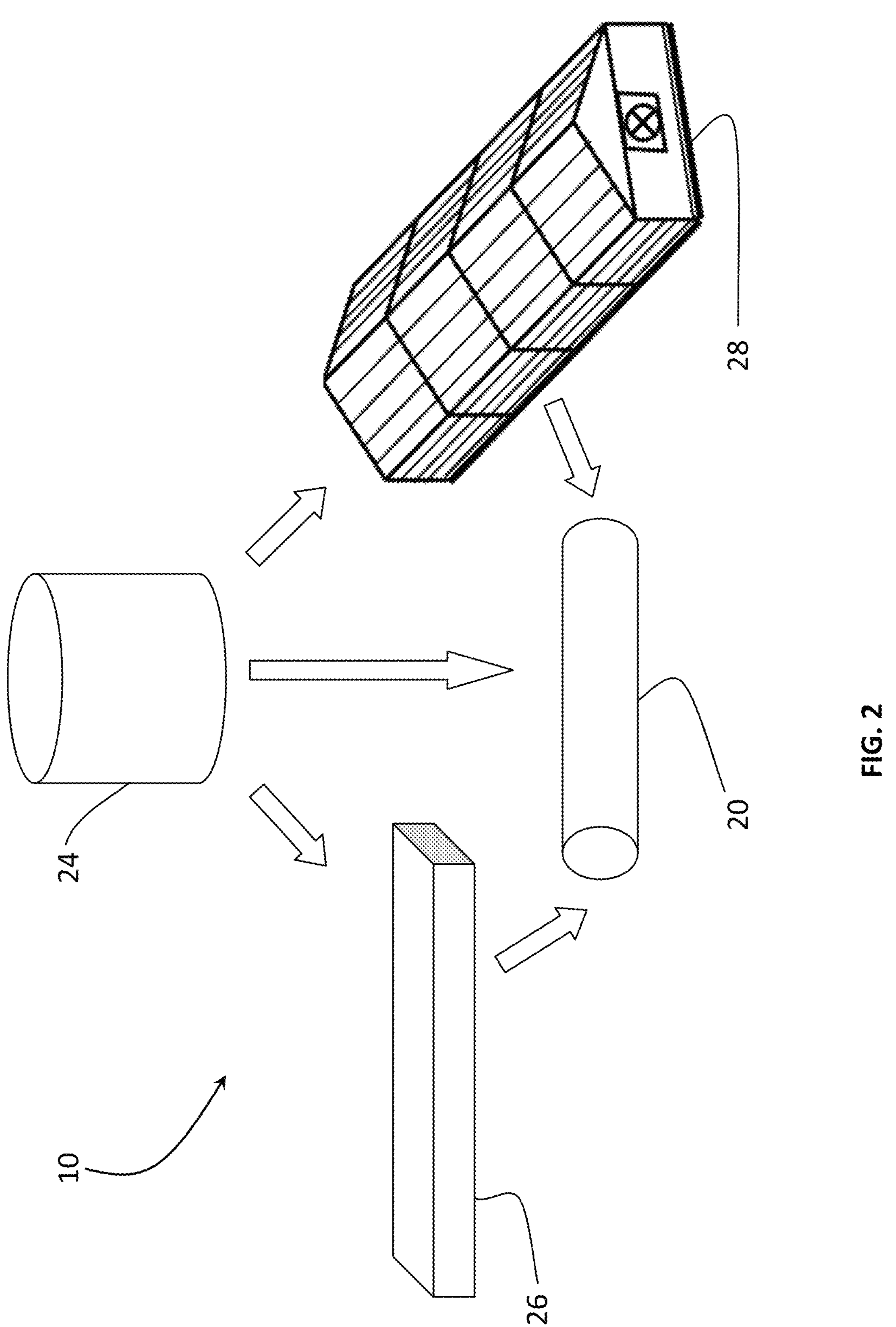
FIG. 2 is a schematic view of an alternative wastewater treatment system pursuant to the invention.

An alternative wastewater treatment system 10 pursuant to the present invention is shown in FIG. 2. There, a single holding, treatment, and settlement vessel 24 is employed in place of the holding tank 12, the first and second reaction tanks 14 and 16, and the settling tank 18. A treated water recipient 20 is again included and again could comprise any vessel, conduit, body of water, or other location or combination thereof capable of receiving water.

In this embodiment, however, enhanced evaporation systems are provided for dewatering and drying the sludge byproduct. More particularly, an open bed dryer 26 is provided for receiving sludge byproduct and permitting a dewatering and drying thereof. Without limitation, an open bed dryer 26 according to the invention could, for instance, comprise a porous bed of sand and, additionally or alternatively, gravel. In use of the open bed dryer 26, a thin layer, such as 12 inches or less, of sludge byproduct can be spread over the substrate of the open bed dryer 26. Wastewater within the sludge can be permitted to drain under the force of gravity through the open bed dryer 26 and to, for instance, drainage pipes or another water recipient 20. Further water removal is naturally provided by evaporation from the sludge surface.

The wastewater treatment system 10 of FIG. 2 includes a further enhanced evaporation system in the form of a greenhouse evaporation dryer 28. The greenhouse evaporation dryer 28 provides a covered drying environment that exploits solar energy to promote the evaporation of water from the sludge byproduct. Where necessary or desirable, solar energy can be supplemented within the greenhouse evaporation dryer 28 by a supplementary heat source, such as a heat pump or other heat source. Wastewater within the sludge can again be permitted to drain under the force of gravity from the greenhouse evaporation dryer 28 to, for instance, drainage pipes or another water recipient 20. Further water removal is naturally provided by evaporation from the sludge surface accelerated by recipient solar energy.

Under such embodiments, wastewater provided for treatment can be held in the vessel 24. The pH balance of the wastewater can then be lowered by the addition of the pH lowering agent and a mixing of the wastewater and the pH lowering agent. With the wastewater retained within the vessel 24, the first compound is introduced, and the wastewater and the first compound are mixed and aerated for a period of time, which can be a predetermined first mixing and aeration time ranging, for instance, from 1 to 12 hours. After that period of time and with the wastewater remaining within the vessel 24, the second compound is introduced and the wastewater and the second compound are mixed and aerated for a second mixing and aeration time. The mixing and aeration time can be a predetermined period of time ranging, for instance, from 1 to 12 hours.

As before, the second compound is a base that tends to raise the pH balance of the wastewater, such as to the 7-10 range on the pH scale, dependent on, among other things, the pH level of the wastewater then to be treated with the second compound and the relative volumes of the wastewater and the second compound. As noted previously, the lowering and raising of the pH of the wastewater according to the invention have been found to promote flocculation.

Again while in the vessel 24 and with the first and second compounds and the wastewater mixed and aerated over the first and second mixing and aeration times, the wastewater is retained to flocculate over a flocculation period. As the flocculation occurs, unwanted substances within the wastewater tend to bond together through absorption and/or adsorption and precipitate to the bottom of the settling tank such that volumes of treated water and sludge byproduct are created.

The treated water can then be drawn off and provided to a treated water recipient 20. Again, the treated water recipient 20 could be any vessel, conduit, body of water, or other location or combination thereof capable of receiving water. As set forth hereinabove, treated water can be recycled through the wastewater treatment system 10 one or more times to enable increasingly refined treatment of the wastewater.

Once the treated water is drawn off, the sludge byproduct is dewatered. For instance, the sludge byproduct can be removed from the vessel 24, transferred to the open bed dryer 26, and spread in one or more layers for dewatering by drainage under the force of gravity to a water recipient 20 and through natural evaporation. Additionally or alternatively, the sludge byproduct can be transferred to the greenhouse evaporation dryer 28 for dewatering through drainage under the force of gravity and evaporation enhanced by recipient solar energy. So disclosed, the wastewater treatment system 10 again is operative as a Sequential Batch Reactor 10.

Figure 3:
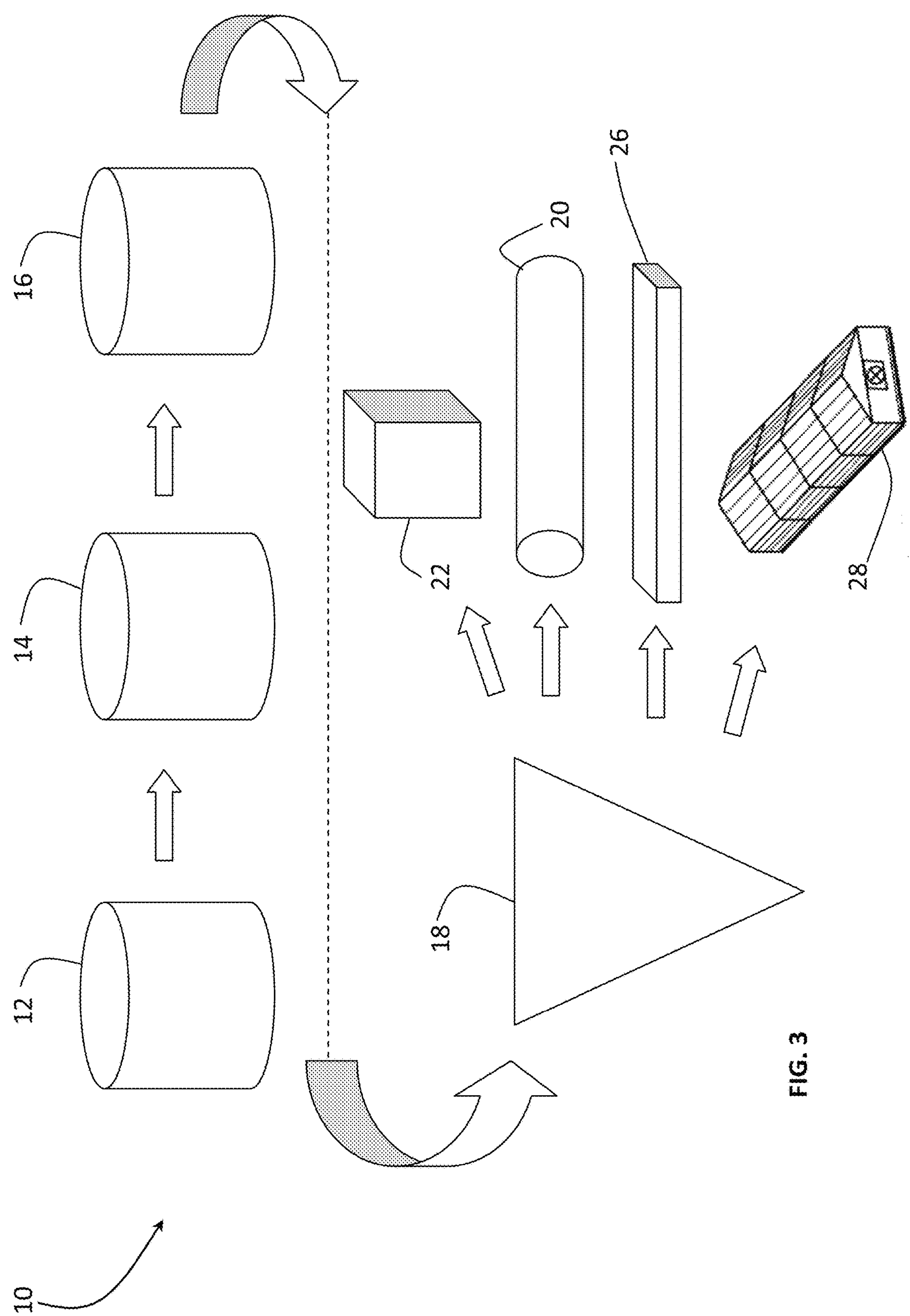
FIG. 3 is a schematic view of a further wastewater treatment system as disclosed herein.

A further Sequential Batch Reactor wastewater treatment system according to the invention is again indicated generally at 10 in FIG. 3. A holding tank 12 is provided for initially holding received wastewater, and the pH balance of the wastewater can be lowered, such as while it is in the holding tank 12, by the addition of the pH lowering agent. A first reaction tank 14 then receives the wastewater, and the first compound is introduced. The wastewater and the first compound are then mixed and aerated within the first reaction tank 14 for a first mixing and aeration time ranging, for instance, from 1 to 12 hours. The wastewater is then advanced to a second reaction tank 16 where the second compound is introduced and mixing and aeration are performed for a second mixing and aeration time. The second mixing and aeration time can be a predetermined period of time ranging, for instance, from 1 to 12 hours.

The wastewater is then advanced to a settling tank 18 where the wastewater is retained for a predetermined period of time to permit flocculation to produce flocculated aggregates and a separation into treated water and a sludge byproduct. The treated water is drawn off and provided to a treated water recipient 20, such as but not limited to a vessel, conduit, body of water, or any other location or combination thereof capable of receiving water. Once the treated water is drawn off, the sludge byproduct is dewatered, such as by transfer to an open bed dryer 26 as previously described and by a spreading into one or more layers for drainage and natural evaporation. The sludge byproduct can additionally or alternatively be transferred to a greenhouse evaporation dryer 28 for dewatering through drainage and evaporation enhanced by recipient solar energy.

It is also contemplated that the compounds disclosed herein could be applied to wastewater in other environments. By way of further example but not limitation, the first and second compounds and the pH lowering agent as necessary could be introduced into ponds, lakes, reservoirs, lagoons or other bodies of water to treat retained wastewater of poor quality, including by promoting flocculation. In such practices of the invention, lower capital costs may be required. Moreover, the treatment method and compounds can, for instance, be applied in situations requiring limited application, such as one-time or periodic remediation.

The Sequential Batch Reactor wastewater treatment system 10 and the methods and compounds disclosed herein have application in a plurality of industries traversing a wide spectrum, including the agricultural, chemical, oil, and gas industries, real estate remediation and development, municipal wastewater treatment, and other industries. Embodiments of the disclosed system and method can confront numerous contaminants, including perfluoroalkyl and polyfluoroalkyl substances (PFAS), chlorinated organic compounds, volatile organic compounds, such as dioxane and furan, regulated metals and other natural and synthetic constituents, which continue to become increasingly problematic. The disclosed wastewater treatment system, method, and compounds are effective in lowering undesirable substances, including total suspended solids (TSS), grease, oil, and other viscous liquids, perfluoroalkyl and polyfluoroalkyl substances (PFAS), nitrogen, phosphates, chemical and biological oxygen demand (COD and BOD), ammonia, fecal matter, synthetic and natural compounds, and other harmful or problematic substances.

When practiced as disclosed herein, the wastewater treatment method results in treated water and a dewatered sludge byproduct that is free of or substantially reduced in synthetic polymers and other unwanted substances. In many instances, particularly where the wastewater is sourced from agriculture, sewage, or food production environments, the sludge byproduct will include useful levels of nitrogen, such as from 1 to 20% based on weight. As such, the sludge byproduct has physical and chemical properties that can enable it to be useful to produce, for instance, fertilizer as a process co-product. According to practices of the invention, portions of the sludge byproduct can be diverted for production of a co-product while other portions of the sludge byproduct are disposed of or returned, potentially in cake, powder, or other form, to the water treatment system 10 to facilitate further processing.

Where some or all of the sludge byproduct is to be utilized to produce a fertilizer co-product, further processing may be practiced to facilitate packaging, transport, and application. As necessary or desirable, further components or amounts of components already included may be added to, or potentially removed from, the sludge byproduct during additional processing to produce a fertilizer meeting particular characteristics. The further processing may include, where necessary, the addition and blending of nitrogen fertilizer materials in solid form to the dewatered sludge byproduct. In certain practices of the invention, the dewatered sludge product can be blended with further agents, such as concentrated acid, oxidizing agents, and, additionally or alternatively, other agents and the product so mixed can be converted to a pumpable paste. The pumpable paste may then be mixed with a hardening agent, and the mixed and hardened byproduct may then be pelletized, such as by use of a granulator.

It will be understood that terms of orientation, nomenclature, and other conventions used herein are merely intended to provide a complete understanding of the disclosed invention and are not limiting. Other conventions may be used without limitation of the teachings herein. Furthermore, the various components disclosed herein are merely illustrative and are not limiting of the invention. For example, except as limited by the claims, each of the components and steps discussed herein may include subcomponents or substeps that collectively provide for the structure and function of the disclosed component or step. Still further, one or more components or steps could be combined as a unitary structure or a single step while still corresponding to the disclosed components or steps. Additional components and steps that provide additional functions, or enhancements to those introduced herein, may be included. For example, additional components, steps, and materials, combinations of components, steps, or materials, and perhaps the omission of components, steps, or materials may be used to create embodiments that are nonetheless within the scope of the teachings herein.

When introducing elements of the present invention or embodiments thereof, the articles "a," "an," and "the" are intended to mean that there are one or more of the elements. The terms "comprising," "including," and "having" are intended to be inclusive such that there may be additional elements other than the listed elements. As used herein, the term "example" or "exemplary" is not intended to imply a superlative example. Rather, "exemplary" refers to an embodiment that is one of many possible embodiments.

With certain details and embodiments of the present invention for wastewater treatment systems, compounds, methods, and co-products disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall define the scope of protection to be afforded to the inventor. Those claims shall be deemed to include equivalent constructions insofar as they do not depart from the spirit and scope of the invention. A plurality of the following claims may express, or be interpreted to express, certain elements as means for performing a specific function, at times without the recital of structure or material. As the law demands, any such claims shall be construed to cover not only the corresponding structure and material expressly described in this specification but also all legally-cognizable equivalents thereof.

I claim as deserving the protection of Letters Patent:

1. A method for the treatment of wastewater, the method comprising:

introducing an acid as a pH lowering agent to the wastewater to lower the pH of the wastewater;

then introducing a first compound to the wastewater wherein the first compound comprises a diatomaceous earth, a coagulant, and a flocculant and wherein the first compound includes chitin or chitosan operative as a coagulant and flocculant and bentonite, wherein the chitin or chitosan comprises approximately 5 to 10% by weight of the first compound;

then mixing and aerating the wastewater with the first compound introduced therein for a first mixing and aeration time;

then introducing a second compound to the wastewater wherein the second compound comprises tempered charcoal and a pH raising agent;

then mixing and aerating the wastewater with the second compound introduced therein for a second mixing and aeration time;

then providing a flocculation period sufficient to allow at least partial separation of the wastewater to yield treated water and a sludge byproduct; and whereby undesirable content within the wastewater is reduced and the sludge byproduct is yielded.

2. The method of claim 1, wherein the second compound comprises activated carbon.

3. The method of claim 2, wherein the second compound further comprises calcium oxide (CaO).

4. The method of claim 3, wherein the second compound further comprises caustic soda (NaOH).

5. The method of claim 4, wherein the second compound further comprises silicon dioxide.

6. The method of claim 4, wherein the activated carbon comprises approximately 40-50% by weight of the second compound and wherein the calcium oxide and caustic soda each comprise approximately 20-25% by weight of the second compound.

7. The method of claim 1, further comprising processing the sludge byproduct to produce a fertilizer co-product.

8. The method of claim 7, wherein processing the sludge byproduct to produce a fertilizer co-product includes the step of dewatering the sludge byproduct.

9. The method of claim 8, wherein processing the sludge byproduct to produce a fertilizer co-product includes the step of introducing and blending nitrogen in solid form with the sludge byproduct.

10. The method of claim 9, wherein processing the sludge byproduct to produce a fertilizer co-product includes the step of pelletizing the sludge byproduct.

11. The method of claim 1, further comprising the step of dewatering the sludge byproduct.

12. The method of claim 11, wherein the step of dewatering the sludge byproduct is performed with a sludge dewatering machine.

13. The method of claim 12, wherein the sludge dewatering machine is chosen from the group consisting of a plate-and-frame filter press, a belt filter press, a centrifuge, a stacked sludge system, and a screw press.

14. The method of claim 11, wherein the step of sludge dewatering is performed with an enhanced evaporation system chosen from the group consisting of an open bed dryer and a greenhouse evaporation dryer.

15. The method of claim 1, wherein the first mixing and aeration time is between 1 and 12 hours.

16. The method of claim 15, wherein the second mixing and aeration time is between 1 and 12 hours.

17. The method of claim 1, wherein the acid comprises sulfuric acid ($H_2SO_4$) or hydrochloric acid (HCl).

18. The method of claim 1, wherein the diatomaceous earth is according to CAS Registry Number 91053-39-3, the bentonite is according to CAS Registry Number 1302-78-9, and the chitin or chitosan is according to CAS Registry Number 9012-76-4.

19. The method of claim 1, wherein the second compound is introduced in a quantity and composition sufficient to raise the pH balance of the wastewater to between approximately 7 and 10 on the pH scale.

20. The method of claim 1, further comprising the steps of measuring the pH of the wastewater, determining a volume of the wastewater, and calculating the quantity of pH lowering agent to be introduced to the wastewater based on the pH of the wastewater as measured and the volume of the wastewater, all prior to the step of introducing the pH lowering agent to the wastewater.

21. The method of claim 1, wherein the step of providing a flocculation period is performed in a settling tank.

* * * * *